United States Patent [19]

Martin

[11] Patent Number: 5,061,836

[45] Date of Patent: Oct. 29, 1991

[54] MICROWAVE DEICING FOR AIRCRAFT ENGINE PROPULSOR BLADES

[75] Inventor: Anthony N. Martin, Simsbury, Conn.

[73] Assignee: United Technologies Corporation, Hartford, Conn.

[21] Appl. No.: 593,602

[22] Filed: Oct. 4, 1990

Related U.S. Application Data

[63] Continuation of Ser. No. 466,808, Jan. 18, 1990, abandoned.

[51] Int. Cl.[5] .................... H05B 6/80; B64D 15/12
[52] U.S. Cl. ................ 219/10.55 M; 219/10.55 F; 219/10.55 R; 244/134 D; 340/581
[58] Field of Search .............. 219/10.55 M, 10.55 R, 219/10.55 F; 244/134 D, 134 F, 134 R; 340/580, 581

[56] References Cited

U.S. PATENT DOCUMENTS

| | | | |
|---|---|---|---|
| 3,397,302 | 8/1968 | Hosford | 244/134 D |
| 4,054,255 | 10/1977 | Magenheim | 244/134 F |
| 4,060,212 | 11/1977 | Magenheim | 244/134 D |
| 4,267,420 | 5/1981 | Brastad | 219/10.55 F |
| 4,365,131 | 12/1982 | Hansman, Jr. | 219/10.55 M |
| 4,876,178 | 10/1989 | Voss et al. | 244/134 D |

*Primary Examiner*—Philip H. Leung
*Attorney, Agent, or Firm*—Donald W. Muirhead

[57] ABSTRACT

A deicing system for an aircraft engine (4) having blades (14, 16) fixedly attached to rotating propulsors (6, 8) has emitters (22, 28) which irradiate microwave beams (24, 26, 30 32) onto coatings (18, 20) which are fixedly attached to said blades (14, 16). Substantially more of the energy of the beams (24, 26, 30, 32) is absorbed by the coatings (18, 20) than by any water or ice on the blades (14, 16) causing any ice which is on the blades (14, 16) to be thrown off by the centrifugal force of the rotating propulsors (6, 8).

9 Claims, 1 Drawing Sheet

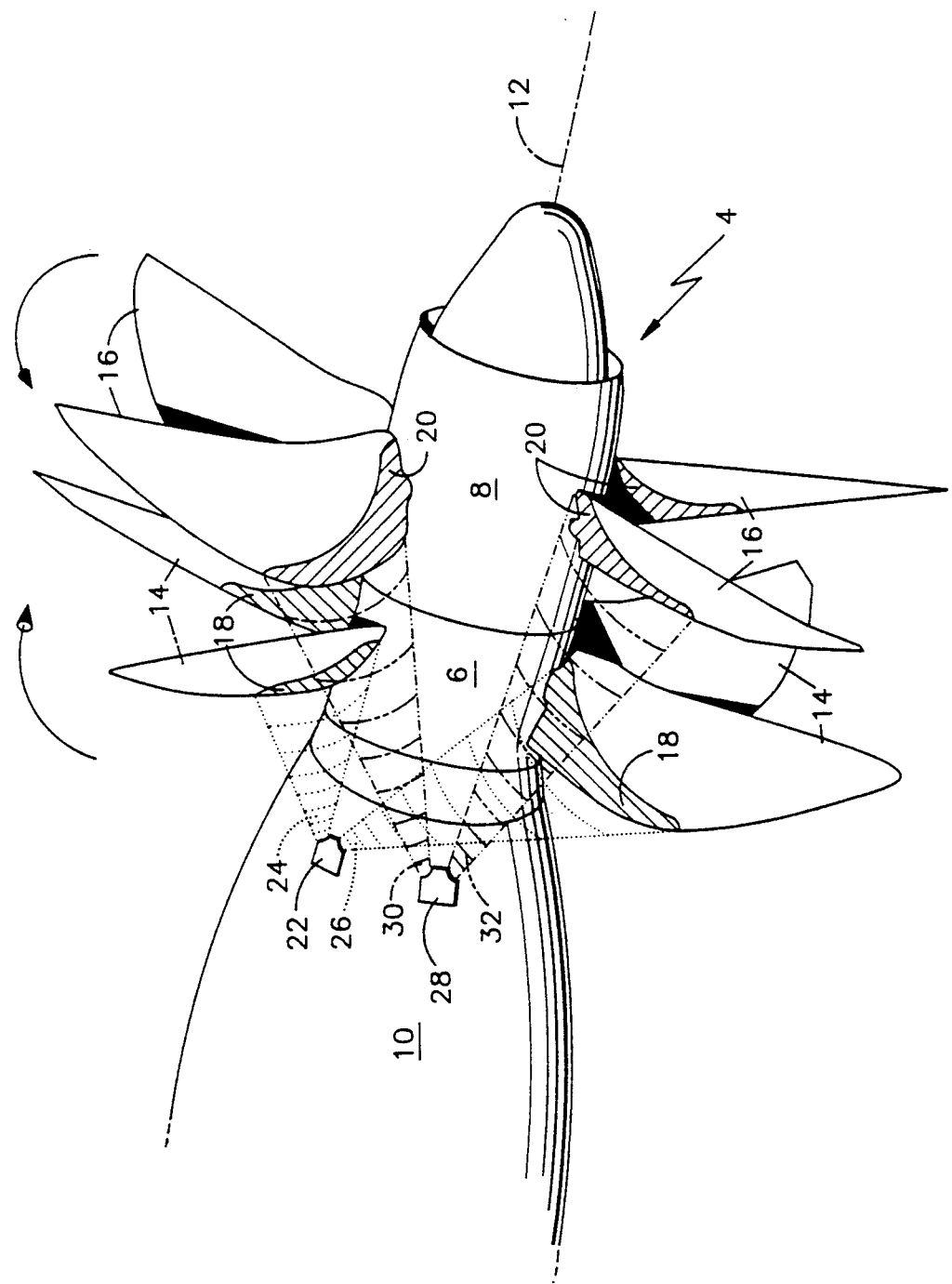

MICROWAVE DEICING FOR AIRCRAFT ENGINE PROPULSOR BLADES

This is a continuation of application Ser. No. 07/466,808, filed Jan. 18, 1990, now abandoned.

TECHNICAL FIELD

This invention relates to aircraft engine propulsor blade deicing and more particularly to employing electromagnetic wave irradiation for aircraft engine propulsor blade deicing.

BACKGROUND ART

Deicing aircraft engine propulsor blades is essential to prevent engine thrust loss. One type of deicing employs electrical heating coils within each of the blades. After a sheet of ice has been allowed to form on the blades, power is applied to the coils, thereby melting the ice which touches the blades (i.e. the ice which is at the contacting surface between the blade and the ice). Since the blades are attached to a rotating propulsor, centrifugal force causes the remaining, non-melted, portion of the ice to be thrown from the blades in a radially outward direction.

The coils are not continuously powered because the centrifugal force of the rotating propulsor would cause continuously heated water to migrate from the radially inward most portion of the blades to radially outward portions of the blades where the water could freeze. Instead, the coils are periodically deactivated in order to allow ice to form on the blades. Applying power to the coils causes the ice to be "shed" (i.e. thrown by the centrifugal force) from the blades. Shedding is a more efficient way to remove ice from propulsor blades because it requires cyclically heating only the radially inward most portion of the blades. Eliminating coils within the radially outward most portions of the blades and eliminating the need to have power applied to the coils continuously reduces the cost of the blades and the power consumed for deicing.

Power is supplied to the coils within the blades by a stationary mounted power source which is coupled to the rotating propulsor through slip rings. The use of slip rings adds to the cost and weight of the engine. Therefore, it is desirable to have an alternative scheme, which does not require electro-mechanical means for supplying remote power to the propulsor, for melting ice off the propulsor blades.

U.S. Pat. No. 4,365,131, entitled "Microwave Ice Prevention System" (Robert J. Hansman Jr.) discloses mounting a microwave transmitter on the non-rotating portion of an engine frame and using microwaves to heat the water on the blades before the water turns to ice. The microwave ice prevention system described in the '131 patent does not require the use of slip rings to supply power to the propulsor blades.

However, the advantages of shedding ice off the propulsor blades is lost with a system such as the one disclosed in the '131 patent. Allowing ice to form on the blades before applying power to the microwave transmitter will not result in the same shedding effect as does allowing ice to form on the blades before applying power to electric heating coils. In the case of the heating coils, the ice which touches the blade is melted in order to shed the ice. The microwave transmitter, however, will melt the outer layer of ice instead of the ice which touches the blade and therefore shedding will not occur.

Since with the '131 system contemplates heating the water continuously or nearly continuously, the water will tend to migrate to the radially outward most portions of the blades and freeze, just as in the case of continuously heating the blades with electric coils. Therefore, continuously heating the water on the blades with microwaves requires that the microwave transmitters irradiate the entirety of the blade surfaces. Heating the entirety of the blade surfaces continuously or nearly continuously tends to increase power consumption and make the transmitters more expensive initially and more expensive to maintain.

DISCLOSURE OF INVENTION

Objects of the invention include microwave deicing which operates cyclically and does not require irradiating the entirety of blade surfaces.

According to the present invention, a microwave beam passes through water and ice and is absorbed by a blade attached to an aircraft engine propulsor whereby cyclically activating and deactivating said beam causes ice which has formed on said blade to be thrown radially outward by the centrifugal force of the propulsor.

The microwave deicer of the present invention provides for ice to be removed from aircraft engine propulsor blades by shedding, which allows for cyclical, as opposed to continuous, activation, thereby reducing power consumption. Furthermore, using a microwave beam to shed ice from aircraft engine propulsor blades requires only that the radially inward most portions of the blades be irradiated, thereby further reducing power consumption.

The foregoing and other objects, features and advantages of the present invention will become more apparent in light of the following detailed description of exemplary embodiments thereof, as illustrated in the accompanying drawings.

BRIEF DESCRIPTION OF DRAWINGS

The sole FIGURE is a propfan engine having provision for aircraft engine propulsor blade deicing according to the invention.

BEST MODE FOR CARRYING OUT THE INVENTION

Referring to the sole FIGURE, a dual propulsor propfan engine 4 is comprised of a forward propulsor 6, a rear propulsor 8, and a non-rotating section 10. The forward propulsor 6 and the rear propulsor 8 rotate about a common central axis 12. The direction of rotation for the forward propulsor 6 is opposite to the direction of rotation for the rear propulsor 8.

The forward propulsor 6 has a plurality of blades 14, comprised of non-metallic composite materials, fixedly attached to the propulsor 6. A thin coating of nickel 18 is fixedly attached to the radially inward most portion of each of the blades 14. Similarly, the rear propulsor 8 has a plurality of blades 16, comprised of non-metallic composite materials, fixedly attached to the propulsor 8. There is a thin coating of nickel 20 fixedly attached to the radially inward most portion of each of the blades 16.

A forward microwave emitter 22, which emits two microwave beams 24, 26 having a frequency of 10 GHz (Gigahertz), is fixedly attached to the non-rotating section 10. The blades 14 rotate through the path of the beam 24 thereby irradiating the nickel coating 18 on one side of the blades 14. Similarly, the blades 14 rotate through the path of the beam 26 thereby irradiating the nickel coating 18 on the other side of the blades 14. Depending upon the number and geometry of the blades 14, the beams 24, 26 may or may not be emitted simultaneously. Electromechanical interlocks (not shown), as known to those skilled in the art, prevent the emitter 22 from emitting the beams 24, 26 unless one of the blades 14 is directly in the path of one of the beams 24, 26.

The energy of the 10 GHz microwave beams 24, 26 is not readily absorbed either by the non-metallic composite blades 14 or by any water or ice which can form on the blades 14. The beams 24, 26 essentially pass through any water or ice on the blades 14 (i.e. the microwave energy of the beams 24, 26 is not converted to heat energy within the water or ice on the blades 14). The nickel coating 18, however, has a resistance of 300 ohms per square and therefore absorbs most of the energy of the beams 24, 26. Absorbing energy from the beams 24, 26 raises the temperature of the coating 18.

A rear microwave emitter 28, which emits two microwave beams 30, 32 having a frequency of 10 GHz, is fixedly attached to the non-rotating section 10. The blades 16 rotate through the path of the beam 30 thereby irradiating the nickel coating 20 on one side of the blades 16 and rotate through the path of the beam 32 thereby irradiating the nickel coating 20 on the other side of the blades 16. Depending upon the number and geometry of the blades 16, the beams 30, 32 may or may not be emitted simultaneously. Electromechanical interlocks (not shown), as known to those skilled in the art, prevent the emitter 28 from emitting the beams 30, 32 unless one of the blades 16 is directly in the path of the beams 30, 32.

Note that since the propulsors 6, 8 are counter-rotating, it is possible for one of the blades 14 of the forward propulsor 6 to block the beams 30, 32 by getting in between the emitter 28 and one of the blades 16. However, the particular angular position at which the blades 14, 16 of the counter-rotating propulsors 6, 8 become aligned is controlled by SYNCHROPHASER controls (not shown), which are well known to those skilled in the art (SYNCHROPAHSER is a registered trademark of United Technologies Corporation). The particular alignment position controls the noise and vibration generated by the propfan engine 4. Since the alignment position is known and is held constant throughout operation of the engine 4, the blades 14 will not block the beams 30, 32 so long as the emitter 28 is mounted where the alignment position is not between the emitter 28 and the blades 16.

The energy of the 10 GHz microwave beams 30, 32 is not readily absorbed by either the non-metallic composite blades 16 or by any water or ice which can form on the blades 16. The beams 30, 32 essentially pass through any water or ice on the blades 16 (i.e. the microwave energy of the beams 30, 32 is not converted to heat energy within the water or ice on the blades 16). The nickel coating 20, however, has a resistance of 300 ohms per square and therefore absorbs most of the energy of the beams 30, 32. Absorbing energy from the beams 30, 32 raises the temperature of the coating 20.

Deicing is achieved by first deactivating the emitters 22, 28 to allow ice to form on the blades 14, 16 and then by activating the emitters 22, 28 to heat the coatings 18, 20 causing the portion of the ice which touches the blades 18, 20 (i.e. the ice which is at the contacting surface between the blades 18, 20 and the ice) to melt. Melting the portion of the ice which touches the blades 14, 16 causes any remaining ice to be thrown from the blades 14, 16 in a radially outward direction due to the centrifugal force of the rotating propulsors 6, 8. The actual activation and deactivation times for the emitters 22, 28, which depend upon a variety of factors such as ambient operational temperature and humidity, are similar to the activation and deactivation times for electric coil deicing systems and hence can be determined by those skilled in the art. The times are on the order of two minutes for deactivation followed by thirty seconds for activation.

Note that it is possible to stagger the deicing of individual ones of the blades 14, 16 so that at a particular time some of the blades 14, 16 are being deiced while other of the blades 14, 16 are not. This would reduce the peak power demand of the emitters 22, 28 and even out the power consumption of the emitters 22, 28.

Even though this invention has been illustrated with a dual propulsor propfan engine 4, the invention can be practiced with any type of aircraft engine which employs one or more propulsors having blades attached thereto. The number of emitters or the number of microwave beams per emitter can be varied without departing from the spirit and the scope of the invention. One emitter can be employed to irradiate the blades of more than on propulsor.

The frequency of the microwave beams 24, 26, 30, 32 can be changed to any frequency which is absorbed by the coatings 18, 20 and is not absorbed by either the blades 14, 16 or any ice or water which may form on the blades 14, 16. Any type of material can be used for the blades 14, 16 or for the coatings 18, 20 so long as the coatings 18, 20 absorb more of the energy of the beams 24, 26, 30, 32 than either the blades 14, 16 or any ice or water which may form on the blades 14, 16. Other possible materials include copper, steel, or gold.

The invention may be practiced without using coatings on the blades if the blades are manufactured from, or impregnated by, a material which absorbs energy of the microwave beams. Also, the absorbant material may be placed inside the blades or may be covered by a coating of paint or lacquer. So long as a portion of the blades (i.e. either the coatings, the blade material, or an impregnated material) absorbs the energy of the microwave beams, the microwave beams can be used to shed ice off of the blades.

Although the invention has been shown and described with respect to exemplary embodiments thereof, it should be understood by those skilled in the art that various changes, omissions and additions may be made therein and thereto, without departing from the spirit and the scope of the invention.

I claim:

1. A microwave deicing system, for deicing aircraft engine propulsor blades, comprising:
    an emitter, for irradiating the blades with a microwave beam having a frequency which is not readily absorbed by water or ice; and
    a portion of the blades for absorbing a substantial amount of said beam.

2. A microwave deicing system, for deicing aircraft engine propulsor blades, according to claim 1, wherein said portion is a coating comprised of one of the following: nickel, steel, gold, or copper.

3. A microwave deicing system, for deicing aircraft engine propulsor blades, according to claim 2, wherein said coating has a resistance of 300 ohms per square.

4. A microwave deicing system, for deicing aircraft engine propulsor blades, according to claim 3, wherein said coating is fixedly attached only to radially inward most sections of the blades.

5. A microwave deicing system, for deicing aircraft engine propulsor blades, according to claim 4, wherein the frequency of said microwave beam is ten Gigahertz.

6. A microwave deicing system, for deicing aircraft engine propulsor blades, according to claim 5, wherein said emitter irradiates a first beam for deicing a first side of the blades and said emitter irradiates a second beam for deicing a second side of the blades.

7. A method of deicing aircraft engine propulsor blades, comprising the steps of
   allowing ice to form on the blades;
   irradiating the blades with a microwave beam having a frequency which passes through water and ice but which is absorbed by portions of the blades.

8. A method of deicing aircraft engine propulsor blades, according to claim 7, wherein said beam is irradiated on radially inward most portion of the blades.

9. A method of deicing aircraft engine propulsor blades, according to claim 8, wherein ice is allowed to form on the blades by deactivating said microwave beam.

* * * * *